United States Patent
Kim

(10) Patent No.: US 6,724,755 B1
(45) Date of Patent: Apr. 20, 2004

(54) AUTOMATIC TELEPHONE CALL TRANSFER APPARATUS IN INTERNET CONNECTION MODE AND METHOD OF SETTING AND CANCELING AUTOMATIC TELEPHONE CALL TRANSFER

(75) Inventor: Do-wan Kim, Siheung (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/222,719

(22) Filed: Dec. 29, 1998

(30) Foreign Application Priority Data

Dec. 30, 1997 (KR) .............................. 97-77768

(51) Int. Cl.⁷ .......................... H04L 12/66; H04L 12/64
(52) U.S. Cl. ...................... 370/356; 370/352; 370/357; 379/88.17; 379/211.02; 379/900
(58) Field of Search ................................ 370/352, 353, 370/354, 357, 360, 902, 912, 356; 379/88.12, 88.17, 210, 212, 900, 211.02

(56) References Cited

U.S. PATENT DOCUMENTS

| | | | | |
|---|---|---|---|---|
| 5,953,322 A | * | 9/1999 | Kimball | 370/328 |
| 6,002,751 A | * | 12/1999 | Shaffer | 379/88.18 |
| 6,038,293 A | * | 3/2000 | McNerney et al. | 379/88.19 |
| 6,049,601 A | * | 4/2000 | Orui | 379/211 |
| 6,078,581 A | * | 6/2000 | Shtivelman et al. | 370/352 |
| 6,438,222 B1 | * | 8/2002 | Burg | 379/215.01 |

FOREIGN PATENT DOCUMENTS

| | | | | |
|---|---|---|---|---|
| JP | 9-135296 | 5/1997 | ............ | H04M/3/42 |
| JP | 10-155039 | 6/1998 | ............ | H04M/11/00 |
| JP | 10-327258 | 12/1998 | ............ | H04M/11/00 |
| JP | 10-513632 | 12/1998 | ............ | H04M/3/42 |
| JP | 11-69008 | 3/1999 | ............ | H04M/11/00 |
| WO | WO 97/20424 | 6/1997 | ............ | H04M/3/42 |
| WO | WO 97/37483 | 10/1997 | ............ | H04M/3/42 |
| WO | WO 98/09185 | 3/1998 | ............ | G02B/6/04 |
| WO | WO 98/53617 | 11/1998 | | |
| WO | WO 98/54871 | 12/1998 | ............ | H04L/12/28 |
| WO | WO 98/56133 | 12/1998 | | |
| WO | WO 99/14924 | 3/1999 | ............ | H04M/3/42 |

* cited by examiner

*Primary Examiner*—Hassan Kizou
*Assistant Examiner*—Joe Logsdon
(74) *Attorney, Agent, or Firm*—Sughrue Mion, PLLC

(57) ABSTRACT

In an automatic telephone call transfer apparatus in an Internet connection mode, an initial value setting portion sets a telephone number of an exchange of a telephone office which will perform a call transfer, a telephone number of an ISP to be subject to the call transfer, and an automatic/manual mode. An automatic call transfer setting/canceling portion transmits data corresponding to the telephone number of an exchange of a telephone office set at the initial value setting portion, call transfer request data, and the telephone number of the ISP to be subject to the call transfer at the connection of an Internet service, and at the termination of the Internet service, transmits the number of the exchange of the telephone number set at the initial value setting portion and data for canceling the call transfer. A modem is connected to a communication line. A telephone connection portion makes a telephone call at the telephone number of the exchange of the telephone office received at the connection and termination of the Internet. A first switch is connected to the telephone connection portion at the connection and termination of the Internet to transmit the data from the automatic call transfer setting/canceling portion to the exchange of the telephone office through a network and then connects to the modem. A voice conversion portion converts analog voice signals to digital signals to perform modulation and compresses and converts the signals into packet data when the voice signals are transmitted, and restores the packet data into analog signals when the voice signal is received. A second switch is connected a telephone to the voice conversion portion in the Internet connection mode and to telephone connection portion in the other mode.

5 Claims, 3 Drawing Sheets

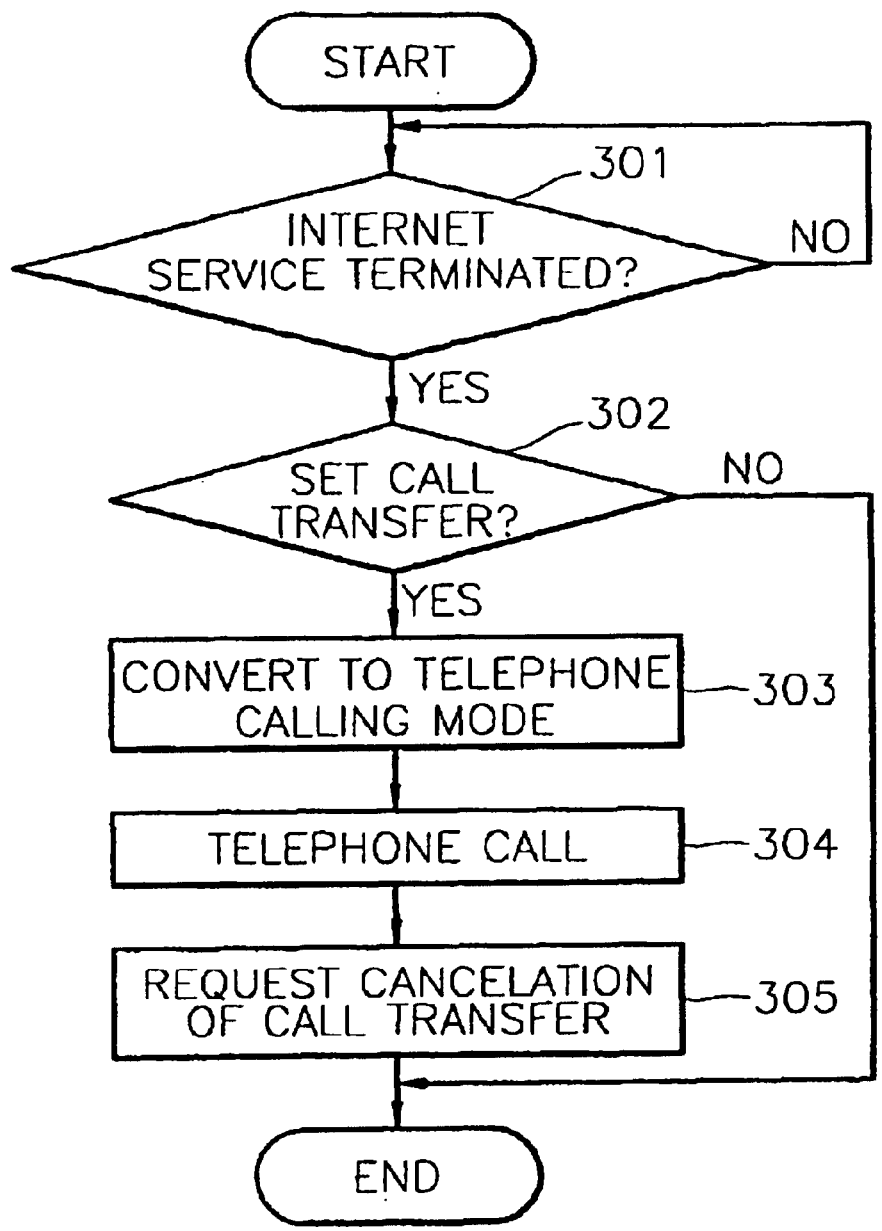

AUTOMATIC TELEPHONE CALL TRANSFER APPARATUS IN INTERNET CONNECTION MODE AND METHOD OF SETTING AND CANCELING AUTOMATIC TELEPHONE CALL TRANSFER

BACKGROUND OF THE INVENTION

1. Field of the Invention

The present invention relates to a communications apparatus and method using the Internet, and more particularly, to an automatic telephone call transfer apparatus in an Internet connection mode which automatically sets and cancels telephone call transfers to enable voice telephone communications through a line connected to the Internet, and a method thereof.

2. Description of the Related Art

When a user at home desires to use Internet services, the user should be connected to an Internet service provider (ISP) using a modem and a point to point protocol (PPP) which is software for the Internet connection and assigned an Internet protocol (IP) address. The user can use Internet services such as the World Wide Web (WWW) using a web browser. Also, by using an Internet phone software, one can make voice communications with other users connected to the Internet. Further, it is possible to concurrently use both voice communications through the Internet phone software and data communications such as file transfer, where an appropriate Internet service is secured.

To use the above Internet services, the following devices are usually required: a personal computer, a modem, a sound card, a microphone, speakers, an operating system (Windows 95, Mac OS, Unix, etc.), PPP, and TCP/IP (transmission control protocol/Internet protocol), a web browser, and an Internet phone software.

The conventional technology using the above hardware operates as follows.

First, a user drives a modem equipped in a computer to connect to a terminal server of an ISP. When the connection to a modem of the server side is completed to exchange data, the PPP software is active and an IP address is assigned from the server according to registration. On receiving the IP address, TCP/IP is ready to be driven and thus the user can connect to any hosts which are connected to the Internet using various Internet software. To use the WWW service, the user executes a web browser such as Netscape navigator or Microsoft's Internet Explorer to connect to a desired web server, and receives data therefrom. The protocol used may be the hyper text transfer protocol (HTTP) for transfer of data such as pictures, texts, and various multimedia files. Also, a software for Internet phone such as a Vocaltec's Internet phone is used to make a voice call, by which users connected to the Internet and using the same software can make a telephone call to each other through the Internet.

However, when a user wishes to receive an ordinary telephone call through a public switched telephone network (PSTN) while using the above Internet phone service, a request for a call transfer should be made to transfer a telephone call to a telephone gateway of the ISP. The telephone exchange receiving the call transfer request makes a call to the telephone gateway of the ISP.

When the Internet service is to be terminated, the above call transfer should be canceled. If the call transfer is not canceled, other telephone calls through PSTN cannot be received.

Thus, according to the conventional technology as above, when a user wishes to make an ordinary telephone call through PSTN while using the Internet service, he/she should request a call transfer manually for each instance. Also, after making the request for a call transfer to the telephone exchange, the user must terminate the Internet service in use and cancel the call transfer in order to make or receive an ordinary telephone call through PSTN.

SUMMARY OF THE INVENTION

To solve the above problems, it is an objective of the present invention to provide an automatic call transfer apparatus in an Internet connection mode which performs setting of an automatic call transfer for Internet connection and canceling of an automatic call transfer for termination of Internet service.

It is another objective of the present invention to provide a method of setting an automatic call transfer in an Internet connection mode so that a telephone call through PSTN can be received during the Internet connection.

It is still another objective of the present invention to provide a method of canceling an automatic call transfer in an Internet connection mode by which the automatic call transfer, which has already been set, can be canceled when the Internet connection is terminated.

Accordingly, to achieve the first objective, there is provided an automatic telephone call transfer apparatus in an Internet connection mode which comprises: an initial value setting portion which sets a telephone number of an exchange of a telephone office which performs a call transfer, a telephone number of an ISP to be subject to the call transfer, and an automatic/manual mode; an automatic call transfer setting/canceling portion which transmits data corresponding to the telephone number of an exchange of a telephone office set at the initial value setting portion, call transfer request data, and the telephone number of the ISP to be subject to the call transfer at the connection of an Internet service, and at the termination of the Internet service, transmits the number of the exchange of the telephone number set at the initial value setting portion and data for canceling the call transfer; a modem to be connected to a communication line; a telephone connection portion which makes a telephone call at the telephone number of the exchange of the telephone office received at the connection and termination of the Internet; a first switch which connects to the telephone connection portion at the connection and termination of the Internet to transmit the data from the automatic call transfer setting/canceling portion to the exchange of the telephone office through a network and then connects to the modem; a voice conversion portion which converts analog voice signals to digital signals to perform modulation and compresses and converts the signals into packet data when the voice signals are transmitted, and restores the packet data into analog signals when the voice signal is received; and a second switch which connects a telephone to the voice conversion portion in the Internet connection mode and to telephone connection portion in the other mode.

To achieve the second objective, there is provided a method for setting an automatic telephone call transfer in an Internet connection mode, the method comprising the steps of: setting an initial value for setting a telephone number of an exchange of a telephone office which performs a call transfer, a telephone number of an ISP to be subject to the call transfer, and an automatic/manual mode; converting the Internet connection mode to a telephone connection mode when the automatic/manual mode is set to an automatic mode at the beginning of the Internet connection; requesting a call transfer by making a telephone call at the telephone number of the exchange of the telephone office; transmitting call transfer data for transmitting data on the telephone number of an Internet service provider after the completion of the call transfer request; and converting the telephone connection mode to the Internet connection mode after completion of the call transfer transmitting step.

To achieve the third objective, there is provided a method for canceling an automatic telephone call transfer in an Internet connection mode in a system in which a call transfer is automatically performed by using a telephone number of an exchange of a telephone office which performs a call transfer and a telephone number of an ISP to be subject to the call transfer, the method comprising: determining whether the Internet service is terminated; converting the Internet connection mode to a telephone connection mode when the Internet service is terminated; and transmitting data for requesting the call transfer by making a telephone call to an exchange of the telephone office in the telephone connection mode.

BRIEF DESCRIPTION OF THE DRAWINGS

The above objectives and advantages of the present invention will become more apparent by describing in detail a preferred embodiment thereof with reference to the attached drawings in which:

FIG. 3 is a flow chart for explaining a method of canceling an automatic call transfer in an Internet connection mode according to the present invention.

DETAILED DESCRIPTION OF THE INVENTION

Figure 1:
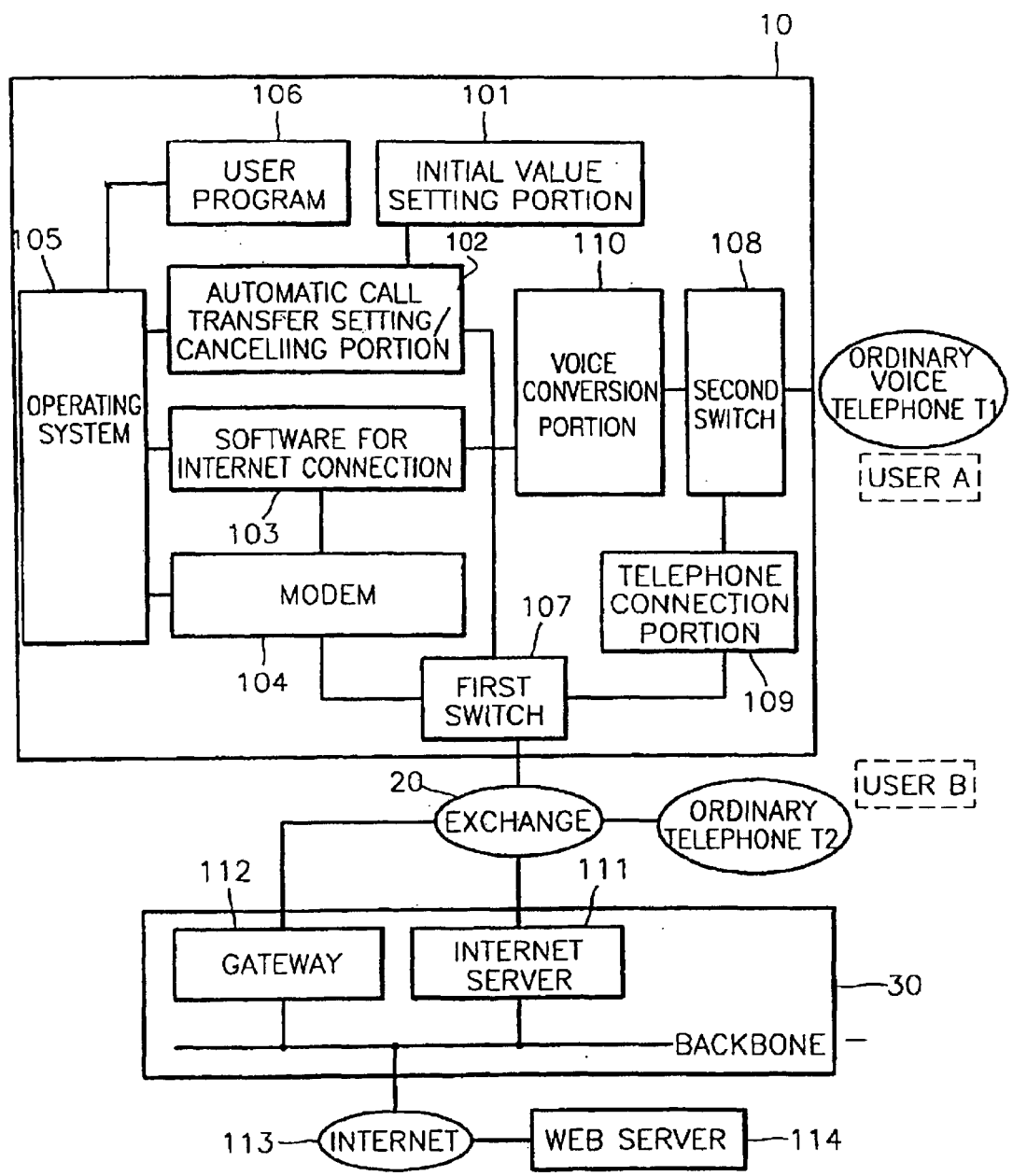
FIG. 1 is a block diagram showing the configuration of an automatic call transfer apparatus in an Internet connection mode according to the present invention.

Referring to FIG. 1, an automatic call transfer apparatus in an Internet connection mode according to the present invention includes a user terminal portion 10, an exchange 20, and an ISP portion 30.

The user terminal portion 10 includes an initial value setting portion 101, an automatic call transfer setting/canceling portion 102, software for Internet connection 103, a modem 104, an operating system 105, a user program 106, first and second switches 107 and 108, a telephone connection portion 109, and a voice conversion portion 110.

The voice conversion portion 110 includes an AD/DA converter (not shown), a PCM codec (not shown), a voice codec (not shown), and a packet processor (not shown). The AD/DA converter converts voice signals of a telephone into digital signals in a transmission mode and digital signals into analog voice signals in a receiving mode. The PCM codec performs pulse code modulation on signals to be transmitted and pulse code demodulation on the signals received. The voice codec compresses data to be transmitted to transmit more data per unit second and decompresses the data received into the original data. The packet processor configures the data to be transmitted to packet data which can be transmitted through the Internet protocol and restores the packet data received to the state before the packet process.

The ISP portion 30 includes an Internet server 111 and a gateway 112 and is connected to a web server 114 via the Internet 113. The Internet server 111 is a computer serving as a server under the Internet circumstances which processes a request from a client through the Internet 113 and informs the result of the process. For example, a user can request web information of the web server 114 using a web browser. The gateway 112 functions to match an ordinary telephone and the Internet phone. When a subscriber of Internet service requests a telephone number corresponding to data requested to call to the exchange 20 and demodulates the packet data input when a telephone call is connected through the Internet to generate voice signals.

The operation of setting an automatic call transfer is as follows.

A telephone number of the exchange 20 at a telephone exchange which performs a call transfer and a telephone number of the ISP portion 30 to which the call is transferred are set in the initial value setting portion 101. Also, an automatic or manual mode for call transfer is set.

When the user terminal portion 10 is connected to the ISP portion 30 using PPP of the software for Internet connection 103 in a state in which the initial value for call transfer is set, the operating system 105 detects the above movement and performs the automatic call transfer through the automatic call transfer setting/canceling portion 102.

That is, when the user terminal portion 10 is connected to the Internet server 111, the automatic call transfer setting/canceling portion 102 determines whether the mode set at the initial value setting portion 101 is an automatic call transfer mode or a manual call transfer mode. If the manual call transfer mode is set, the user is asked whether the automatic call transfer will be performed. When "O.K." data is input, the automatic call transfer is performed. If "Cancel" data is input, the user terminal portion 10 is connected to the Internet without setting the automatic call transfer.

The automatic call transfer setting/canceling portion 102 reads the telephone number of the telephone exchange 20 which is set at the initial value setting portion 101 and outputs the read number to the telephone connection portion 109. Also, the automatic call transfer setting/canceling portion 102 controls the first switch 107 to connect the exchange 20 and the telephone connection portion 109. The telephone connection portion 109 makes a telephone call to the telephone exchange 20 at the telephone number input from the automatic call transfer setting/canceling portion 102. If the exchange 20 responds to the call, the call transfer request data generated by the automatic call transfer setting/canceling portion 102, which is generally DTMF tone, is transmitted to the exchange 20 and the data of the telephone number of the ISP, 30 subject to the call transfer is transmitted instantly.

The automatic call transfer setting/canceling portion 102 controls the first switch 107 to connect the modem 104 and the exchange 20 so that a normal Internet connection is made.

Next, the operation of canceling the call transfer will be described.

When the Internet connection software 103 terminates the Internet service, the line to the modem 104 is disconnected and the operating system 105 detects the disconnection and requests, that the automatic call transfer setting/canceling portion 102 cancel the automatic call transfer.

The automatic call transfer setting/canceling portion 102 controls the first switch 107 to connect the telephone connection portion 109 and the exchange 20. Also, the automatic call transfer setting/canceling portion 102 makes a telephone call to the exchange 20 of the telephone office which provides a call transfer service set in the initial value setting portion 101. If the exchange 20 responds to the call, the automatic call transfer setting/canceling portion 102 transmits data for requesting cancellation of the automatic call transfer to the exchange 20. The exchange 20 cancels the set call transfer.

As described above, the automatic call transfer can be set at the initial stage of the Internet connection and also the set call transfer can automatically be canceled at the termination of the Internet service.

Assuming a case in which a user A operating the user terminal portion 10 automatically sets a call transfer by making a connection to the Internet and is using the Internet service and another user B makes a call at the telephone number of the user A, the operation of the call transfer is as follows.

When the user B tries to make a call using an ordinary telephone T2 to an ordinary voice telephone T1 of the user A, the exchange 20 of the telephone office detects that the user A is on the telephone and performs a call forwarding to the gateway 112 at the telephone number of the ISP 30 which is set to be subject to the call transfer. At this time, the gateway 112 searches for the telephone number of the ISP 30 which is set to the call transfer and detects whether the user A is connected to the Internet server. If the user A is not currently connected to the Internet, such information is transmitted to the exchange 20 to indicate that the line is busy. However, if the user A is connected to the Internet, the gateway 112 transmits telephone receiving data to the user terminal portion 10 along with Internet service data and informs the user A of the fact that the telephone call is received through the voice conversion portion 110.

Then, when the user A responds to the telephone call by the user B, the user A can make a voice telephone communication with the user B through the voice conversion portion 110 and the gateway 112, concurrently with receiving the Internet service such as data transfer.

Figure 2:
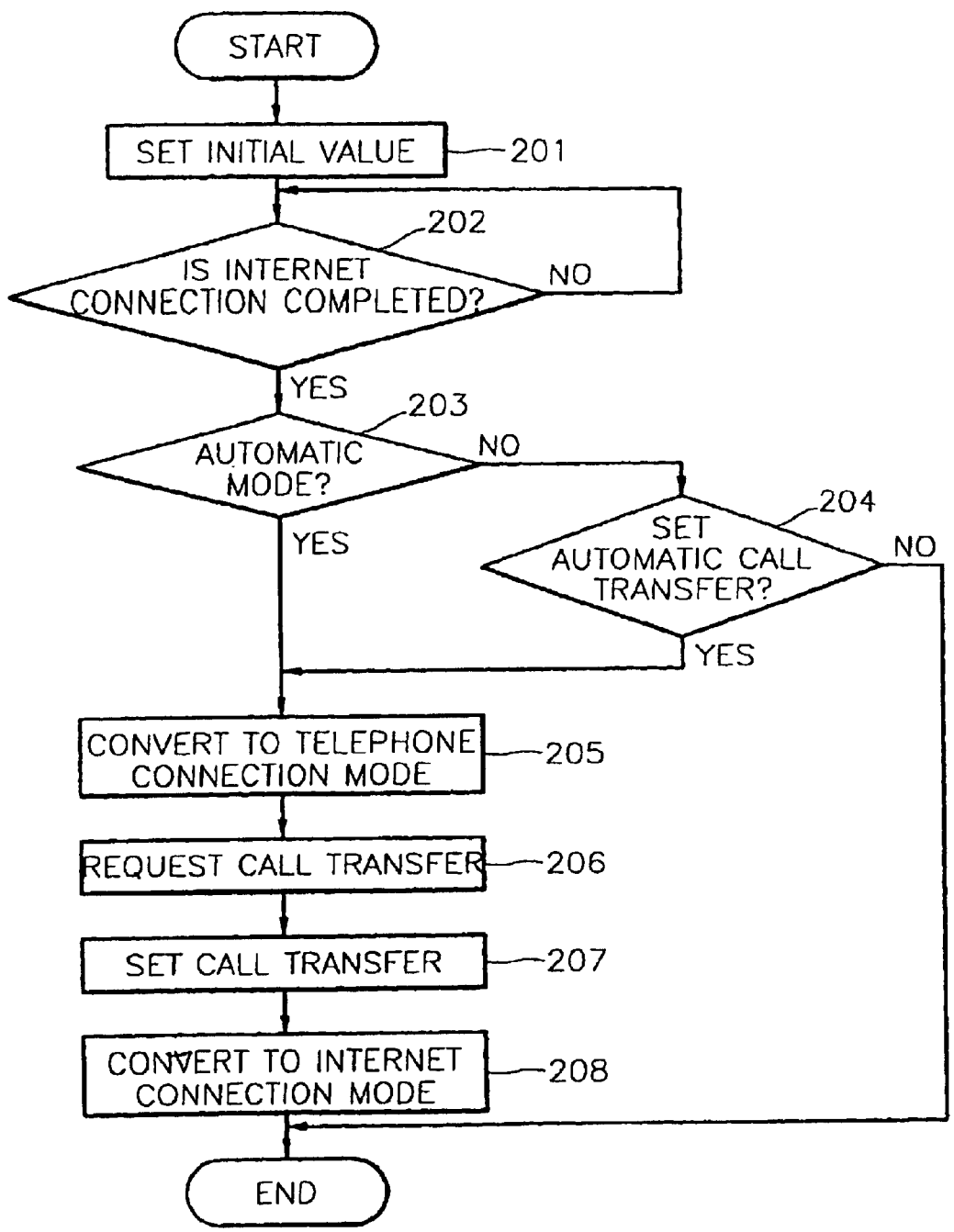
FIG. 2 is a flow chart for explaining a method of setting an automatic call transfer in an Internet connection mode according to the present invention.

Next, a method of setting an automatic call transfer in an Internet connection mode according to the present invention will be described with reference to FIG. 2.

In step 201, the telephone number of the exchange 20 of the telephone office performing the call transfer and the telephone number of the ISP 30 subject to the call transfer are set. Also, an automatic/manual mode is set which is information on whether the call transfer is to be performed automatically or manually.

In step 202, whether a program requesting connection to the Internet service provider (ISP) through the modem 104 is driven is detected by using the Internet connection program of the user terminal portion 10.

If the Internet connection is made, it is determined whether the call transfer setting mode set at the initial stage is an automatic mode or a manual mode, in step 203.

If it is determined to be the manual mode in step 203, an indication that the automatic call transfer is not set is sent through the terminal of the user and the user is asked whether the automatic call transfer is to be performed, in step 204. If the automatic call transfer is requested by the user, the system changes to the automatic call transfer mode and step 205 which will be described later is performed. Otherwise, the setting of the automatic call transfer is ignored and the connection to the Internet continues.

In step 205, the Internet connection mode is converted to a telephone connection mode in order to make a call to the exchange 20 of the telephone office.

In step 206, a telephone call is attempted at the telephone number of the exchange 20 of the telephone office which is set at the initial stage. If the exchange 20 responds to the call, the call transfer request data is transmitted to the exchange 20.

In step 207, the data on the telephone number of the ISP portion 30 to be subject to the call transfer which is initially set in step 201 is transmitted to the exchange 20 to set the call transfer.

In step 208, the telephone calling mode is converted to the Internet connection mode so that the normal Internet service can be resumed.

Thus, the automatic call transfer in the Internet connection mode can be set as above.

Next, a method of canceling an automatic call transfer in an Internet connection mode according to the present invention will be described with reference to FIG. 3.

In step 301, the Internet service being received is terminated and it is determined whether the connection between the Internet and the modem is broken.

When the Internet service is determined to be terminated in step 301, it is determined whether a call transfer is set at the exchange 20, in step 302.

In step 303, if the call transfer is set according to the determination in step 302, the system is changed to a telephone calling mode.

In step 304, a telephone call is made to the exchange 20 of the telephone office in which the call transfer is set. At this time, if the exchange 20 responds to the call, data requesting cancellation of the call transfer which is set in step 305 is transmitted to the exchange 20. Then, the call transfer set at the exchange 20 is canceled.

Through the above steps, the telephone number which is subject to the call transfer is automatically canceled at the termination of the Internet connection.

As described above, according to the present invention, the call transfer setting is automatically performed as the system is connected to the Internet and the already set call transfer is automatically canceled at the termination of the Internet connection. Thus, the operations which have been manually performed according to the conventional technology can be automatically performed for the convenience of users.

What is claimed is:

1. An automatic telephone call transfer apparatus in an internet connection mode, comprising:

an initial value setting portion which sets a telephone number of an exchange of a telephone office which performs a call transfer, a telephone number of an Internet Service Provider (ISP) subject to said call transfer, and an automatic/manual mode;

an automatic call transfer setting/canceling portion which outputs data corresponding to said telephone number of said exchange of said telephone office set at said initial value setting portion, call transfer request data, and said telephone number of said ISP subject to said call transfer upon connection to an Internet service, and at termination of the Internet service, outputs said telephone number of said exchange set at said initial value setting portion and data for canceling said call transfer;

a modem connected to a communication line;

a telephone connection portion which calls said telephone number of said exchange of said telephone office received at connection and termination of the Internet service;

a first switch, connected between said modem and said telephone connection portion, wherein at the connection and termination of the Internet service, said first switch transmits said data output from said automatic call transfer setting/canceling portion to said exchange of said telephone office;

a voice conversion portion which converts analog voice signals to digital signals, compresses said digital signals, and converts compressed signals into packet data when voice signals are transmitted, and restores received packet data into analog signals when a voice signal is received; and a second switch which connects a telephone to said voice conversion portion in the Internet connection mode, and which connects said telephone to said telephone connection portion in a telephone connection mode.

2. A method for setting an automatic telephone call transfer in an Internet connection mode, comprising:

setting an initial value for a telephone number of an exchange of a telephone office which performs a call transfer, a telephone number of an Internet Service Provider (ISP) subject to said call transfer, and an automatic/manual mode;

converting said Internet connection mode to a telephone connection mode when said automatic/manual mode is set to an automatic mode;

requesting a call transfer by calling said telephone number of said exchange of said telephone office;

transmitting call transfer data for transmitting data on said telephone number of said ISP after completion of a call transfer request; and converting said telephone connection mode to said Internet connection mode after completion of said call transfer transmitting step.

3. A method for canceling an automatic telephone call transfer in an Internet connection mode in a system in which a call transfer is automatically performed by using a telephone number of an exchange of a telephone office which performs a call transfer and a telephone number of an Internet Service Provider (ISP) subject to said call transfer, said method comprising:

determining whether Internet service is terminated;

converting said Internet connection mode to a telephone connection mode when the Internet service is terminated; and transmitting data for requesting said call transfer by calling said exchange of said telephone office in said telephone connection mode.

4. An automatic telephone call transfer apparatus in an internet connection mode, comprising:

an automatic call transfer setting/canceling portion which outputs data corresponding to a telephone number of an exchange of a telephone office which performs call transfer, call transfer request data, and a telephone number of an Internet Service Provider (ISP) subject to said call transfer upon connection to an Internet service, and at termination of the Internet service, outputs said telephone number of said exchange and data for canceling said call transfer;

a modem connected to a communication line;

a telephone connection portion which calls said telephone number of said exchange of said telephone office received at connection and termination of the Internet service; and a first switch, connected between said modem and said telephone connection portion, wherein at the connection and termination of the Internet service said first switch transmits said data from said automatic call transfer setting/canceling portion to said exchange of said telephone office.

5. A method for setting an automatic telephone call transfer in an Internet connection mode, comprising:

requesting a call transfer by calling a telephone number of an exchange of a telephone office which performs said call transfer;

transmitting call transfer data on a telephone number of an Internet service provider after completion of a call transfer request; and converting a telephone connection mode to said Internet connection mode after completion of said call transfer transmitting step.

* * * * *